(12) United States Patent
Watanabe et al.

(10) Patent No.: US 10,343,936 B2
(45) Date of Patent: Jul. 9, 2019

(54) MEMBRANE CASING AND MEMBRANE COMPONENT

(71) Applicant: KUBOTA CORPORATION, Osaka-shi, Osaka (JP)

(72) Inventors: Keishi Watanabe, Amagasaki (JP); Shintaro Nishimoto, Amagasaki (JP); Tetsuya Uenaka, Amagasaki (JP)

(73) Assignee: KUBOTA CORPORATION, Osaka-shi (JP)

( * ) Notice: Subject to any disclaimer, the term of this patent is extended or adjusted under 35 U.S.C. 154(b) by 421 days.

(21) Appl. No.: 15/124,703

(22) PCT Filed: Mar. 10, 2015

(86) PCT No.: PCT/JP2015/056916
§ 371 (c)(1),
(2) Date: Sep. 9, 2016

(87) PCT Pub. No.: WO2015/141515
PCT Pub. Date: Sep. 24, 2015

(65) Prior Publication Data
US 2017/0015569 A1 Jan. 19, 2017

(30) Foreign Application Priority Data
Mar. 20, 2014 (JP) ................................ 2014-057451

(51) Int. Cl.
*C02F 1/44* (2006.01)
*B01D 63/06* (2006.01)
(Continued)

(52) U.S. Cl.
CPC .............. *C02F 1/44* (2013.01); *B01D 63/066* (2013.01); *B01D 65/003* (2013.01); *B01D 65/02* (2013.01);
(Continued)

(58) Field of Classification Search
None
See application file for complete search history.

(56) References Cited

U.S. PATENT DOCUMENTS

| | | | |
|---|---|---|---|
| 5,062,910 A | 11/1991 | Garcera et al. | |
| 5,405,528 A * | 4/1995 | Selbie | B01D 35/303 210/232 |
| 2007/0131605 A1 | 6/2007 | Watari et al. | |

FOREIGN PATENT DOCUMENTS

| FR | 475 445 A | 5/1915 |
|---|---|---|
| JP | S56-102602 U | 8/1981 |

(Continued)

OTHER PUBLICATIONS

Sep. 28, 2017 Extended Search Report issued in European Patent Application No. 15765789.1.

(Continued)

*Primary Examiner* — Kirshnan S Menon
(74) *Attorney, Agent, or Firm* — Oliff PLC

(57) ABSTRACT

A membrane casing that watertightly houses a membrane element for filtering raw water includes a tubular casing main body, a lid body, and a pressing mechanism. The casing main body houses a membrane element. The lid body fits an opening end of the casing main body and is movable in the axial direction of the casing main body while maintaining the attitude and while securing watertightness with the casing main body. The pressing mechanism and presses the lid body to press and hold the membrane element housed in the casing main body. The membrane casing has a simple configuration capable of watertightly securing using a predetermined pressing force by accommodating variations in size of the membrane element, even if the membrane casing cannot be formed into a cylindrical shape.

14 Claims, 15 Drawing Sheets

(51) Int. Cl.
*B01D 65/00* (2006.01)
*B01D 65/02* (2006.01)

(52) U.S. Cl.
CPC .. *B01D 2201/296* (2013.01); *B01D 2201/303* (2013.01); *B01D 2201/304* (2013.01); *B01D 2201/605* (2013.01); *B01D 2313/02* (2013.01); *B01D 2313/13* (2013.01); *B01D 2313/20* (2013.01); *B01D 2313/21* (2013.01); *B01D 2321/04* (2013.01); *B01D 2321/18* (2013.01)

(56) References Cited

FOREIGN PATENT DOCUMENTS

| JP | S56-114803 U | 9/1981 |
|----|--------------|--------|
| JP | S63-20003 A  | 1/1988 |
| JP | H05-33831 U  | 5/1993 |
| JP | 2002-224505 A | 8/2002 |
| JP | 2010-063955 A | 3/2010 |

OTHER PUBLICATIONS

Jun. 16, 2015 Written Opinion issued in Patent Application No. PCT/JP2015/056916.

Jun. 16, 2015 International Search Report issued in Patent Application No. PCT/JP2015/056916.

Dec. 26, 2017 Notification of Reason(s) for Refusal in Japanese Patent Applicaiton No. 2014-057451.

Mar. 5, 2018 Office Action issued in Chinese Patent Application No. 201580012586.6.

Oct. 31, 2018 Office Action issued in European Patent Application No. 15765789.1.

Partial English Translation of Mar. 5, 2018 Office Action issued in Chinese Patent Application No. 201580012586.6.

\* cited by examiner

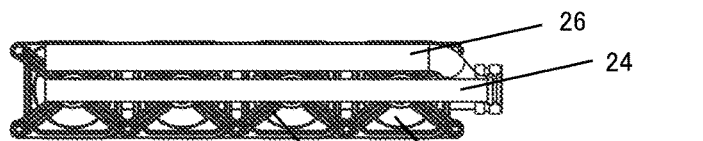
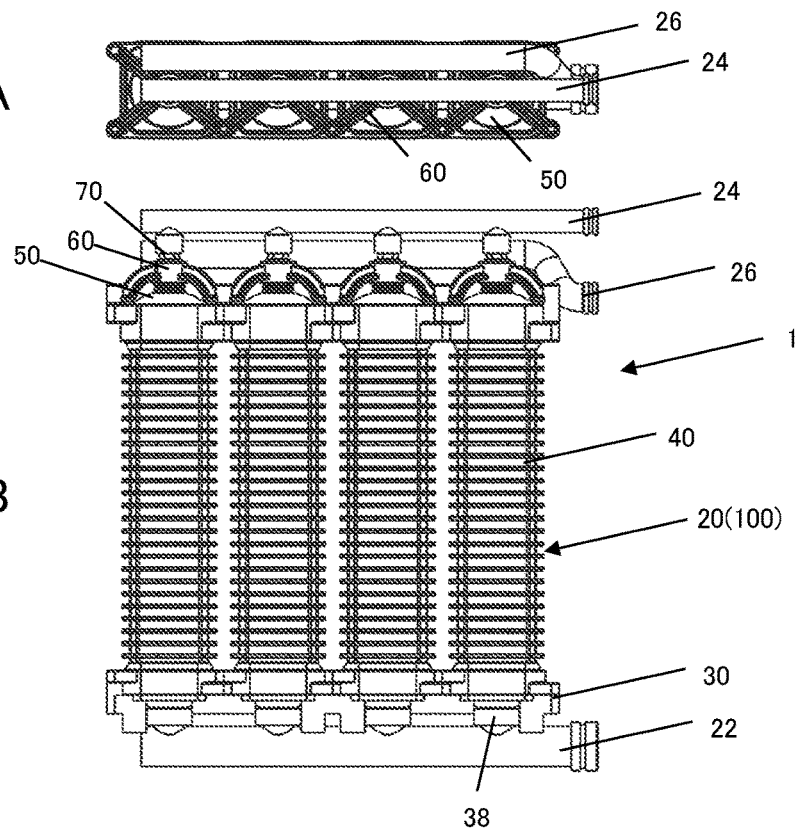
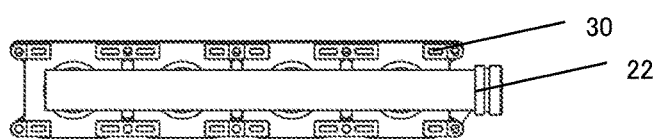
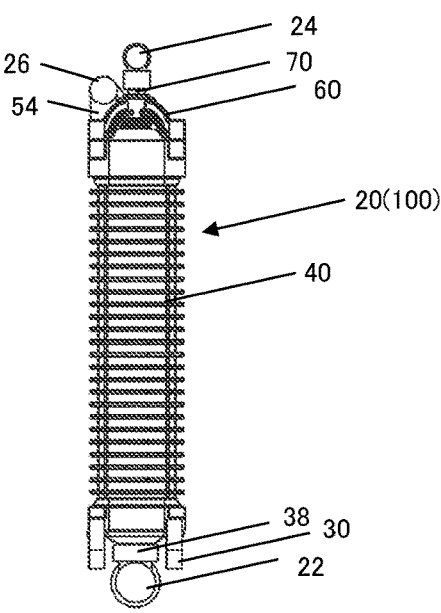

Water to be treated

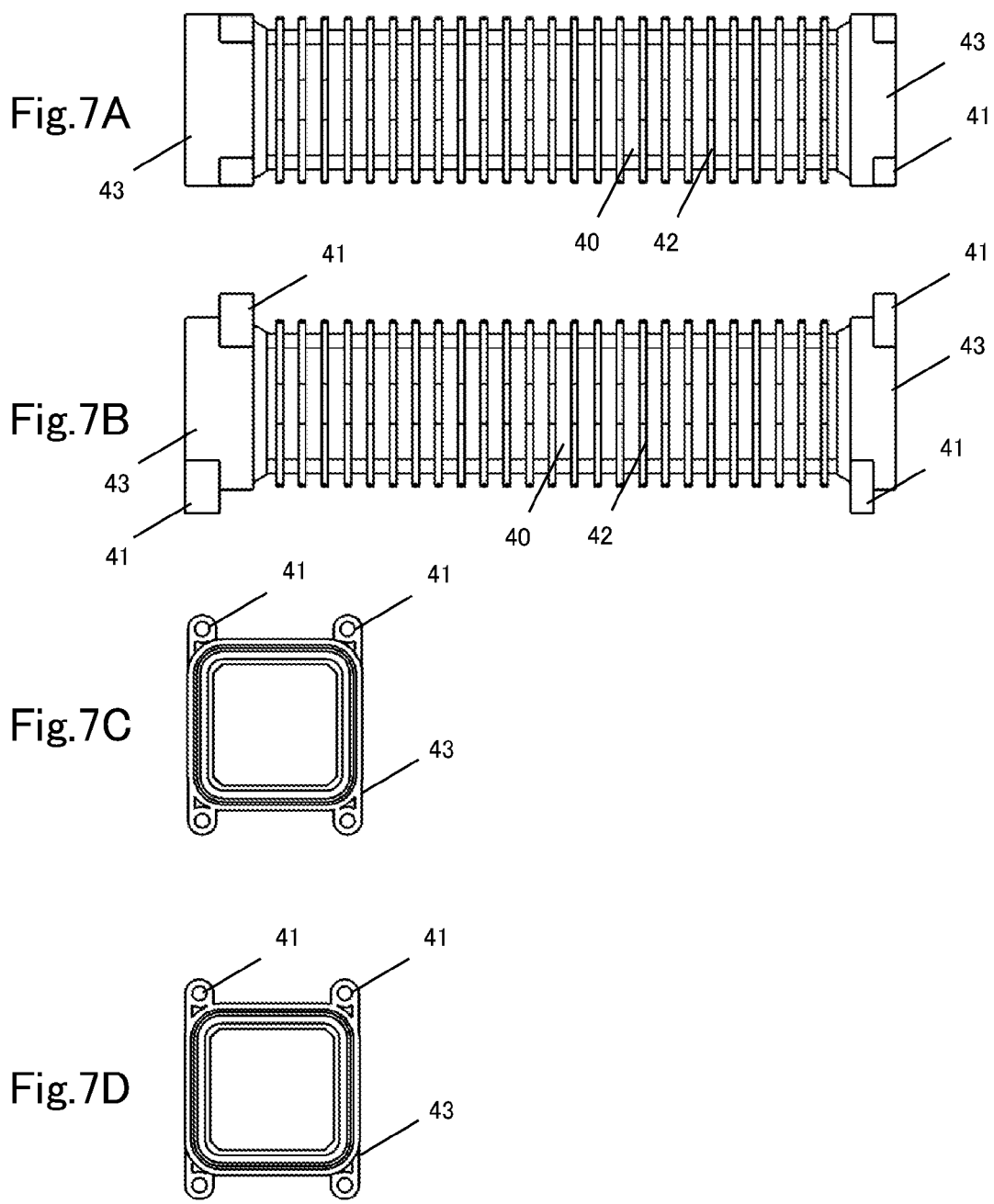

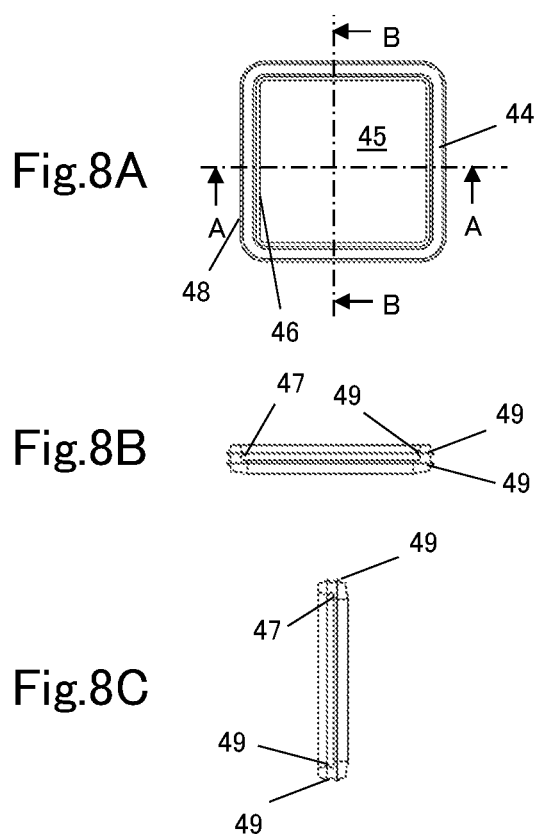

MEMBRANE CASING AND MEMBRANE COMPONENT

TECHNICAL FIELD

The present invention relates to a membrane casing that watertightly houses, via a seal member, a membrane element for filtering raw water, and to a membrane component in which the membrane casing houses the membrane element.

BACKGROUND ART

Patent document 1 discloses filter cartridges serving as membrane components that house cylindrical filter main bodies. These filter cartridges include filter cases, which serve as membrane casings. The filter cases are constituted of cylindrical filter-case main bodies that house the filter main bodies, and filter-case lid bodies that can be screwed to threaded portions formed on the inner peripheries of edges of the filter-case main bodies.

These membrane components are configured so that predetermined regions of the filter main bodies will be positionally secured by seal members in a watertight manner by tightening, after the filter main bodies with the seal members disposed on the tops and the bottoms of the filter main bodies are put in the filter-case main bodies, the filter-case lid bodies that can be screwed to the filter-case main bodies.

PRIOR ART DOCUMENTS

Patent Documents

[Patent document 1] Japanese Patent No. 4361219

SUMMARY OF INVENTION

Problems to be Solved by the Invention

When the filter main bodies housed in such membrane components are ceramic membrane elements, it has been required to individually adjust pressing forces on the seal members because the sizes, specifically the lengths in the axial directions of the filter-case main bodies, vary to some extent depending on temperature conditions during sintering and other conditions.

For this reason, the membrane casings disclosed in Patent document 1 have achieved a watertight state by adjusting the degrees of tightening of the filter-case lid bodies on the cylindrical filter-case main bodies to adjust the relative distances between the bottoms of the filter-case main bodies and the filter-case lid bodies.

However, if the membrane casings cannot be formed into cylindrical shapes because, for example, the membrane elements are formed into non-cylindrical shapes such as prismatic shapes, there has been the problem that employing cylindrical filter cases having diameters larger than the diameters of the membrane elements results in larger membrane components and increase not only the footprints but the costs of equipment. Accordingly, there has been the problem that it is not possible to employ such a structure that adjusts a screwed state of the filter-case main bodies and the filter-case lid bodies and to positionally secure the predetermined regions of the filter main bodies in a watertight manner.

The present invention has an object to provide a membrane casing that has a simple configuration capable of watertightly securing a membrane element using a predetermined pressing force by accommodating variations in size of the membrane element, even if the membrane casing cannot be formed into a cylindrical shape, and to provide a membrane component.

Means for Solving the Problems

To achieve the object above, a first characteristic configuration of a membrane casing according to the present invention is, as set forth in claim 1 in the document of claims, that a membrane casing configured to watertightly house a membrane element for filtering raw water includes a tubular casing main body, a lid body, and a pressing mechanism. The casing main body houses the membrane element. The lid body fits an opening end of the casing main body and is configured to be movable in the axial direction of the casing main body while maintaining the attitude and while securing watertightness with the casing main body. The pressing mechanism is configured to press the lid body to press and hold the membrane element housed in the casing main body.

The lid body is fitted to the opening end of the tubular casing main body housing the membrane element, and the pressing mechanism presses the lid body. The lid body thus moves in the axial direction of the casing main body while maintaining the attitude and while securing watertightness with the casing main body, and presses the membrane element. Adjusting the degree of pressing by the pressing mechanism individually keeps the membrane element appropriately pressed and held even if the membrane element varies in length in the axial direction of the casing main body.

A second characteristic configuration of the same is, as set forth in claim 2 in the same document, that the pressing mechanism may include a supporting unit and a maintaining unit, in addition to the first characteristic configuration above. The supporting unit may be configured to be supported by the casing main body. The maintaining unit may be configured to adjustably maintain the relative positions of the supporting unit and the lid body along the axial direction of the casing main body.

The relative positions of the casing main body and the lid body are adjusted by adjusting, using the maintaining unit, the relative positions of the lid body and the supporting unit supported by the casing main body, and the individual membrane element is kept appropriately pressed and held.

A third characteristic configuration of the same is, as set forth in claim 3 in the same document, that the lid body may have a fluid conducting opening, and the maintaining unit may include a fluid conducting pipe, in addition to the first or the second characteristic configuration above. A fluid inside the casing main body may be capable of flowing through the fluid conducting opening. The fluid conducting pipe may be capable of being communicatably coupled to the fluid conducting opening.

A fluid flows into the casing main body through the fluid conducting pipe formed in the maintaining unit and the fluid conducting opening formed in the lid body. This configuration eliminates the need for providing a fluid conducting pipe separately in a position not interfering with the pressing mechanism, and enables a compact membrane casing to be created.

A fourth characteristic configuration of the same is, as set forth in claim 4 in the same document, that the maintaining unit may include a tubular unit, and the supporting unit may include an annular unit, in addition to the second or the third characteristic configuration above. The tubular unit may have an externally threaded portion on the outer periphery. The annular unit may have on its inner periphery an internally threaded portion configured to be screwed to the externally threaded portion of the maintaining unit.

The tubular unit, which is the maintaining unit, is screwed to the annular unit formed in the supporting unit, and the degree of screwing is adjusted, so that the maintaining unit presses the lid body on the basis of the supporting unit. The degree of pressing can be adjusted by the degree of screwing, and the individual membrane element is kept appropriately pressed and held.

A fifth characteristic configuration of the same is, as set forth in claim 5 in the same document, that the supporting unit may include a plurality of arch-shaped beam units to which the annular unit may be coupled, in addition to the fourth characteristic configuration above. The beam units may curve toward the outside of the casing.

The reaction force on the lid body that is pressing the membrane element housed in the casing main body is applied to the annular unit. Since the annular unit is coupled to the plurality of arch-shaped beam units, the strong beam units can stably receive the reaction force even if the reaction force is large.

A sixth characteristic configuration of the same is, as set forth in claim 6 in the same document, that the lid body may be configured to be fitted to the opening end of the casing main body, a seal member may be disposed on an outer peripheral edge of the lid body, and the inner peripheral faces of the casing main body may be at least partially smooth, in addition to any one of the first to the fourth characteristic configurations above. The seal member may ensure watertightness between the outer peripheral edge of the lid body and the inner peripheral faces of the casing main body. The inner peripheral faces of the casing main body may be smooth at least in a moving range of the seal member.

When the seal member on the outer peripheral edge of the lid body moves along the inner peripheral faces of the casing main body, the seal member can move while securing a watertight state because the inner peripheral faces are smooth. In addition, the seal member will not break or degrade even when the seal member rubs against the inner peripheral faces of the casing main body while moving. Reliability can be thus ensured.

A seventh characteristic configuration of the same is, as set forth in claim 7 in the same document, that the moving range of the seal member may be set to the end edge portion of the casing main body, and the end edge portion may have a diameter larger than the diameter of the central portion of the casing main body, in addition to the sixth characteristic configuration above.

Since the end edge portion of the casing main body has a diameter larger than the diameter of the central portion of the casing main body, the gap between the membrane element housed in the casing main body and the inner peripheral faces of the casing main body is wider than the gap on the central portion. When the membrane element needs to be replaced, such a wide gap can be beneficially used to pinch and remove the membrane element easily. The maintainability can be thus improved while the overall casing main body is configured to be compact.

A characteristic configuration of a membrane component according to the present invention is, as set forth in claim 8 in the same document, that the membrane element is housed in a membrane component including any one of the first to the seventh characteristic configurations above.

Effects of Invention

As described above, the present invention has enabled provision of a membrane casing that has a simple configuration capable of watertightly securing a membrane element using a predetermined pressing force by accommodating variations in size of the membrane element, even if the membrane casing cannot be formed into a cylindrical shape, and has enabled provision of a membrane component.

BRIEF DESCRIPTION OF DRAWINGS

FIG. 2A, FIG. 2B, FIG. 2C, and FIG. 2D are respectively a plan view, a front view, a bottom view, and a left-side view of the membrane module constituted of the membrane components according to the present invention.

FIG. 7A, FIG. 7B, FIG. 7C, and FIG. 7D are respectively a side view, a front view, a plan view, and a bottom view of a casing main body of the membrane casing.

FIG. 8A is a plan view of a seal member of the membrane casing, FIG. 8B is a cross-sectional view taken along the line A-A in FIG. 8A, and FIG. 8C is a cross-sectional view taken along the line B-B in FIG. 8A.

EMBODIMENTS FOR CARRYING OUT THE INVENTION

Figure 1:
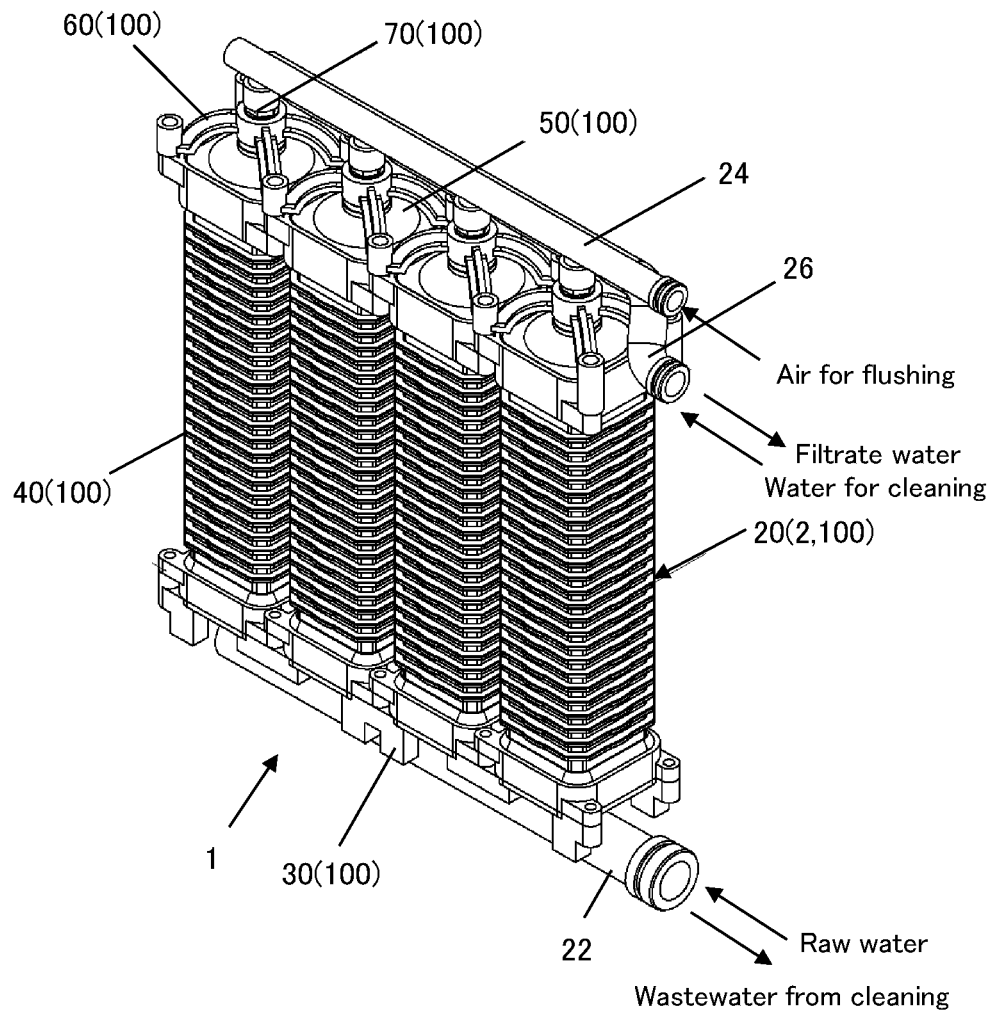
FIG. 1 is a perspective view of a membrane module constituted of membrane components according to the present invention.

The following describes a membrane casing, a membrane component, and a membrane module including the membrane component, according to the present invention.

FIG. 1 and FIG. 2A to FIG. 2D illustrate a membrane module 1 constituted of membrane components 20 according to the present invention. The membrane module 1 includes four membrane components 20, a raw-water header pipe 22 for supplying raw water to each of the membrane components 20, a cleaning header pipe 24 for supplying air, water, or a chemical solution for cleaning to each of the membrane components 20, and a filtrate-water header pipe 26 for collecting filtrate water from each of the membrane components 20.

Each of the membrane components 20 is constituted of a membrane casing 100 and a membrane element 2 housed in the membrane casing 100. The membrane casing 100 is configured to include a base 30, a casing main body 40, an upper lid body 50, a supporting unit 60 supported by the casing main body 40, a maintaining unit 70 that adjustably maintains the relative positions of the supporting unit 60 and the upper lid body 50 along the axial direction of the casing main body 40, and other constituents.

In a filtering process, raw water supplied through the raw-water header pipe 22 is filtered by the membrane element 2, and the filtrate water is collected through a filtrate-water discharging pipe 54 on the upper lid body 50 into the filtrate-water header pipe 26. In a cleaning process, water for cleaning is supplied through the filtrate-water header pipe 26, washes the membrane element 2, and is discharged through the raw-water header pipe 22. After that, air or the like for cleaning is supplied through the cleaning header pipe 24 to perform flushing. The materials of the base 30, the casing main body 40, the upper lid body 50, the supporting unit 60, the maintaining unit 70, and other constituents may be metal, resin, or other materials as long as the materials can withstand pressures in the filtering process and the cleaning process.

Figure 4:
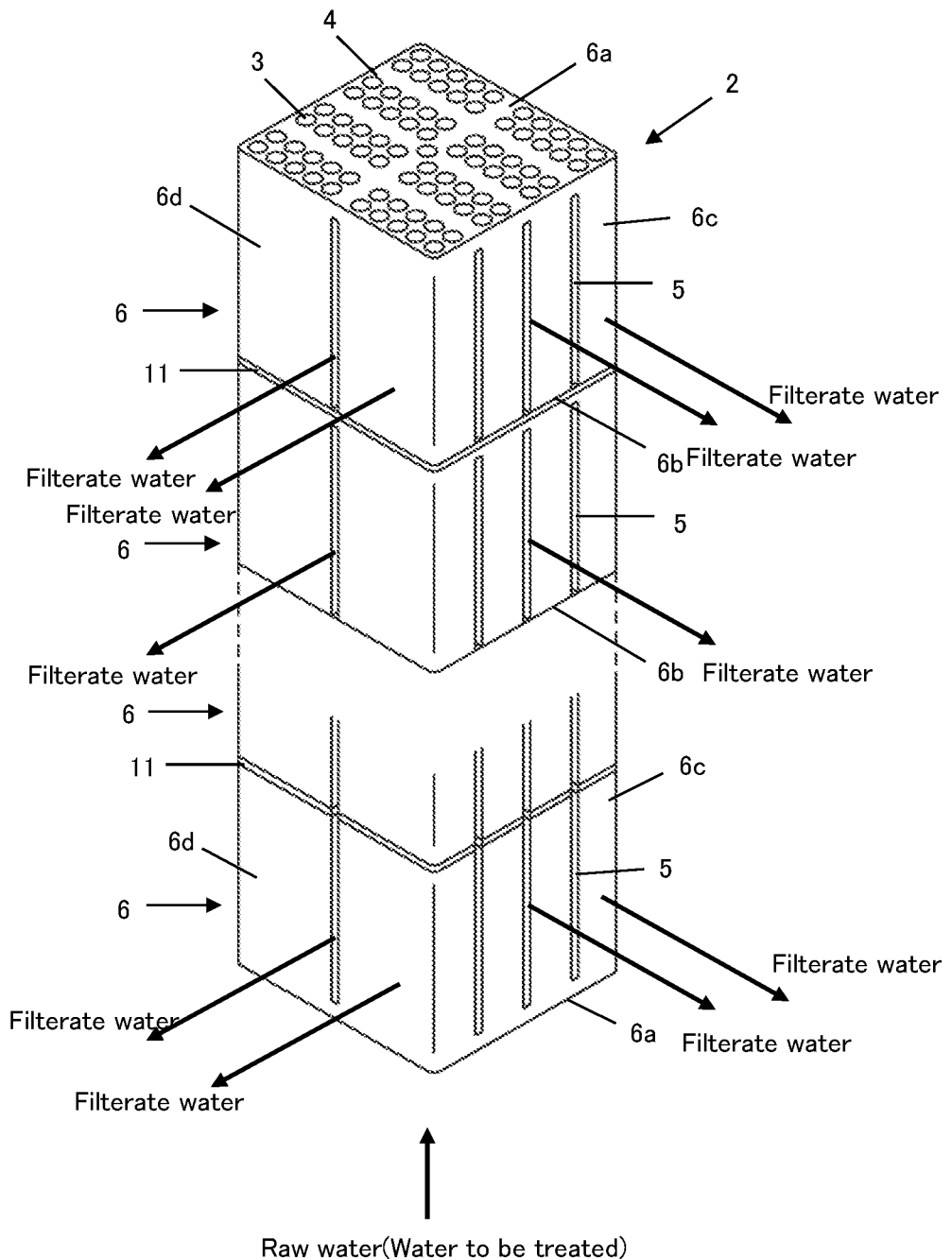
FIG. 4 is an illustrative diagram for a filtering process using the membrane element.

FIG. 4 illustrates the membrane element 2 used in the membrane module 1 according to the present invention. The membrane element 2 is constituted of a plurality of ceramic moldings 6 coupled to each other via binder layers 11.

Figure 3A:
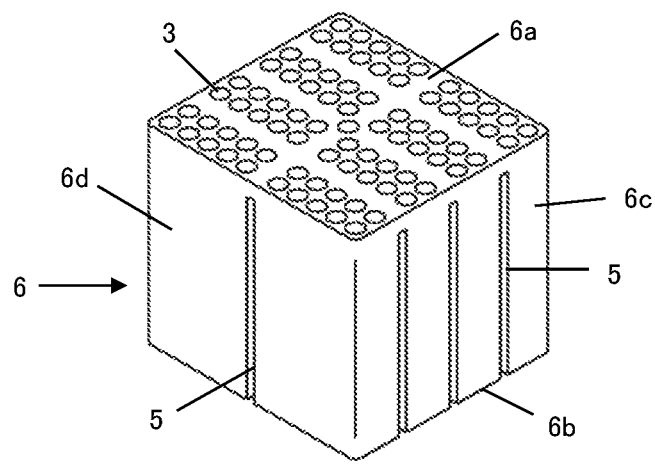
FIG. 3A is a perspective view for illustrating a front face, a top face, and a right-side face of a porous body that is a constituent of a membrane element.
Figure 3B:
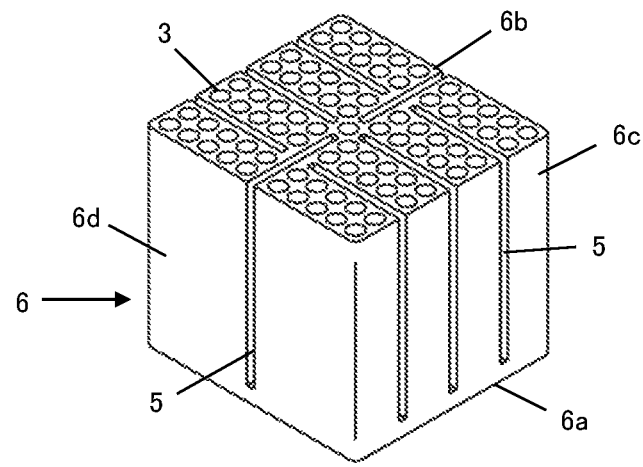
FIG. 3B is a perspective view for illustrating a back face, a bottom face, and a left-side face of the porous body.

As illustrated in FIG. 3A and FIG. 3B, each of the ceramic moldings 6 is an approximately rectangular parallelepiped and has a plurality of fluid conducting holes 3 bored between a pair of opposed end faces 6a and 6b through the ceramic molding. The ceramic molding 6 has a plurality of slits 5 that are open on side faces 6c and 6d. One end of each of the slits 5 is closed on the base-end-side end face 6a, and the other end is open on the opposed end face 6b.

On the opposed end face 6b, two slits 5 extending from the center toward the side faces 6d and six slits 5 extending toward the side faces 6c orthogonally to the two slits 5 divide the fluid conducting holes 3 into eight blocks. One fluid conducting hole 3 is formed at the center, and the blocks each include ten fluid conducting holes 3.

In the present embodiment, the ceramic molding 6 has 81 fluid conducting holes 3, and the inner wall surface of each of the fluid conducting holes 3 has a filtration membrane.

Such a ceramic molding 6 can be obtained by press-forming a ceramic granule.

The binders 11 are respectively disposed between the opposed faces 6a and 6b of the plurality of ceramic moldings 6, and sintering is performed at a predetermined temperature for a predetermined period of time with the ceramic moldings 6 aligned so that the fluid conducting holes 3 will overlap and communicate with each other. This process forms a base material formed of a porous body in which the plurality of ceramic moldings 6 are integrally coupled to each other.

In this manner, seven ceramic moldings 6 are stacked, and the porous base material for the membrane element is formed.

Finally, a slurry containing ceramic particles is applied to the inner peripheral faces of the fluid conducting holes 3 of the ceramic moldings 6, and a sintering treatment is performed, so that filtration membrane layers 4 (see FIG. 4) are formed on the inner peripheral faces of the fluid conducting holes 3.

As illustrated in FIG. 4, after blocking top and bottom end faces of the membrane element 2 of the porous body constituted in this manner with coatings of glass, resin, or the like, raw water, which is water to be treated, is pressed into the fluid conducting holes 3 from, for example, the lower-end side. The filtering process proceeds to remove specific components with the filtration membrane layers 4 formed on the inner walls of the fluid conducting holes 3. The filtrate water flows out of the surfaces 6c and 6d and the slits 5 of the base material, and treated water can be obtained from the water to be treated by collecting the filtrate water.

The membrane element 2 described above is only an example, and its specific configuration is not limited to the configuration of the embodiment. For example, the membrane element 2 is formed of the plurality of ceramic moldings stacked in the present embodiment, but the membrane element 2 can be formed by other various methods such as forming by extrusion molding and bundling a plurality of tubular membranes in a parallel arrangement using a tube plate.

The following describes a specific configuration of the membrane components 20 and the membrane casings 100 constituting the membrane module 1 in detail on the basis of the drawings.

As illustrated in FIG. 6A to FIG. 6D, the base 30 of the membrane components 20 includes four recessed units 36 in a row corresponding to four membrane components 20 constituting the membrane module 1. Protruding walls 33 are formed into approximately square shapes so as to fit the casing main bodies 40 that have approximately square-shaped cross-sections, on the central portions of frame bodies 34 each supported by legs 32. The recessed units 36 are formed inside the protruding walls 33.

The central portion of each of the recessed units 36 is integral with a raw-water supply pipe 38 that is coupled to the raw-water header pipe 22 and introduces raw water. The frame bodies 34 each have bolt insertion holes 31 used for tightening and securing each of the casing main bodies 40 in positions corresponding to the corners of each of the protruding walls 33. The lower end edge of the raw-water supply pipe 38 has an annular recessed portion 39 to which an O-ring 39a is fitted, and is watertightly coupled to the raw-water header pipe 22 laterally disposed below. The lower end edge of the outer periphery of the protruding wall 33 has an annular recessed portion 35 to which an O-ring 35a is fitted, and is watertightly coupled to the inner wall of the casing main body 40.

As illustrated in FIG. 7A to FIG. 7D, the casing main body 40 is constituted of a tubular body having an approximately square-shaped cross-section. The casing main body 40 includes a plurality of ribs 42 on its outer peripheral faces to secure strength, and further includes flanges 43 that have diameters larger than the diameter of the central portion at both ends.

Corners of the flanges 43 have bolt insertion holes 41. The area of the approximately square-shaped cross-section is configured to be larger than the area of the cross-section of the membrane element 2 so that the casing main body 40 can house therein the membrane element 2 described above. The water filtered by the membrane element 2 is configured to permeate and be stored in a space between the peripheral faces 6c and 6d of the membrane element 2 sandwiched by the opposed faces 6a and 6a, and the inner peripheral faces of the casing main body 40.

The casing main body 40 is disposed to stand on the protruding wall 33 of the base 30 and secured with bolts inserted through the bolt insertion holes 31 of the base 30 and the bolt insertion holes 41 of the casing main body 40.

Figure 6A:
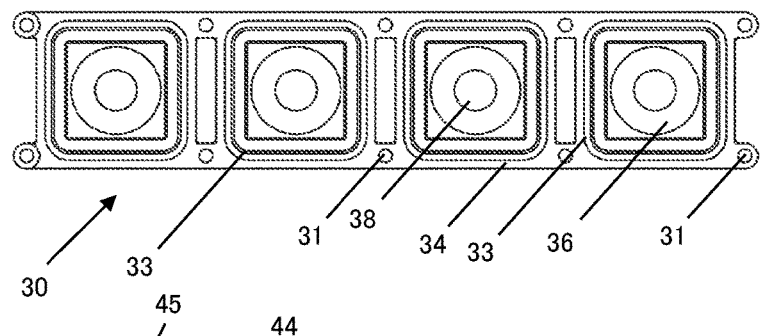
FIG. 6A, FIG. 6B, FIG. 6C, and FIG. 6D are respectively a plan view, a front view, a back view, and a right-side view of a base of the membrane casing.
Figure 6B:
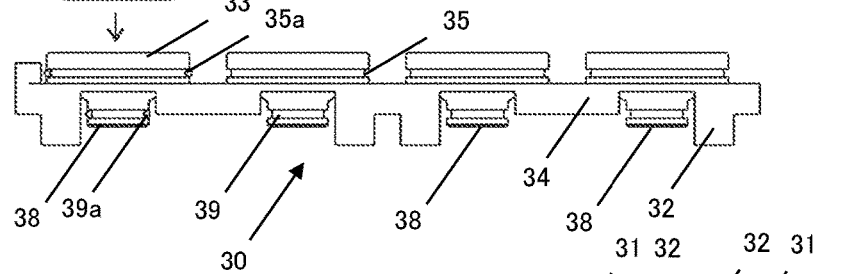
Figure 6C:
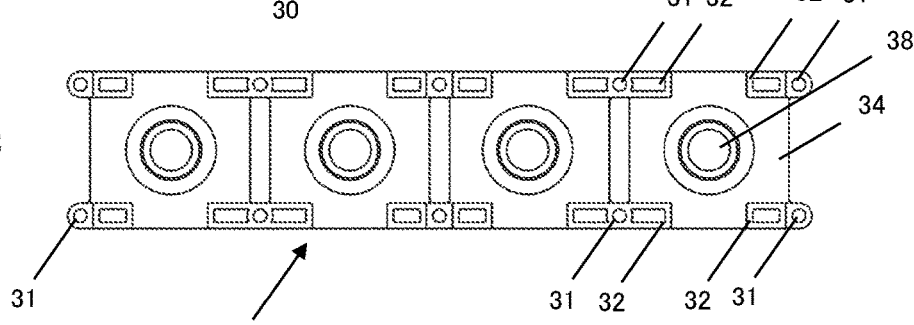
Figure 6D:
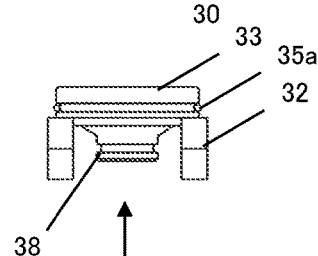

As illustrated in FIG. 6B, the recessed portion 36 of the base 30 houses a rubber seal 44 serving as a seal member, and houses the membrane element 2 described above on the rubber seal 44. A flat surface on the peripheral edge of the recessed portion 36 supports the outer faces of the rubber seal 44, and the peripheral edge of the bottom end face 6a (see FIG. 4) of the membrane element 2 is pressed on the inner faces of the rubber seal 44, so that the raw-water supply pipe 38 and the bottom end face 6a of the membrane element 2 are watertightly sealed.

As illustrated in FIG. 8A, FIG. 8B, and FIG. 8C, the rubber seal 44 has on its central portion an opening 45 through which raw water can flow, and has on its inner wall 46 a step portion 47 that comes into contact with the bottom faces of the corners of the bottom end face 6a of the membrane element 2. In addition, the inner wall 46 and an outer wall 48 include linear protrusions 49. Protrusions 49 on the inner wall 46 are configured to come into close contact with the peripheral faces 6c and 6d (see FIG. 4) of the membrane element 2, and a protrusion 49 on the outer wall 48 is configured to come into close contact with the inner wall of the protruding wall 33. Accordingly, the raw water supplied through the raw-water supply pipe 38 flows into the fluid conducting holes 3 through the bottom end face 6a of the membrane element 2 while leakage into the space between the peripheral faces 6c and 6d of the membrane element 2 and the casing main body 40 is prevented.

Figure 5:
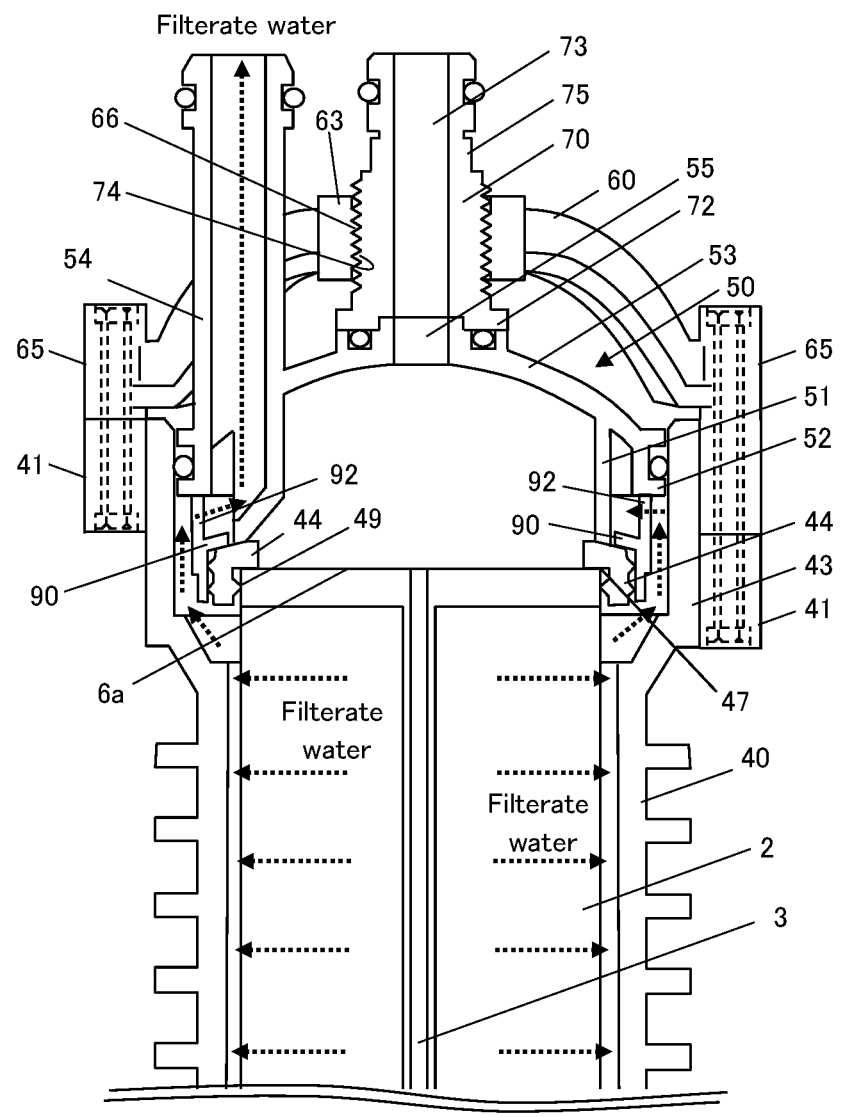
FIG. 5 is an illustrative diagram for a membrane casing constituting one of the membrane components.

As illustrated in FIG. 5, a similar rubber seal 44 is also disposed on the top end face 6a (see FIG. 4) of the membrane element 2 housed in the casing main body 40, and the outer periphery of this rubber seal 44 is covered with a seal cover 90 that applies pressure on the rubber seal 44 from the periphery to cause a linear protrusion 49 on the inner wall to come into close contact with the peripheral faces of the membrane element 2.

Figures 9A, 9B:
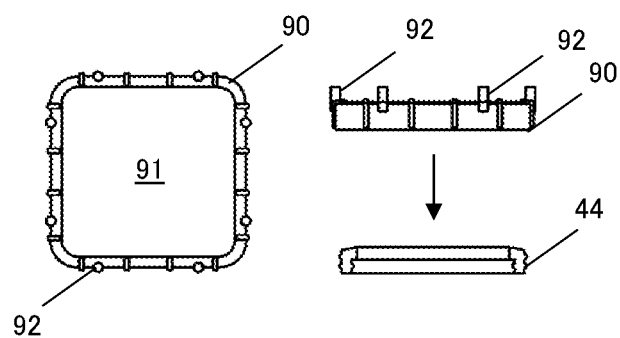
FIG. 9A and FIG. 9B are respectively a plan view and a side view of a seal-pressing member of the membrane casing.
Figure 10A:
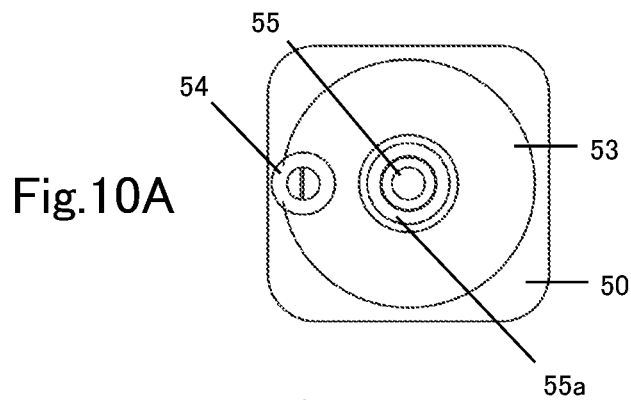
FIG. 10A, FIG. 10B, FIG. 10C, and FIG. 10D are respectively a plan view, a front view, a left-side view, and a bottom view of an upper lid body of the membrane casing.
Figure 10B:
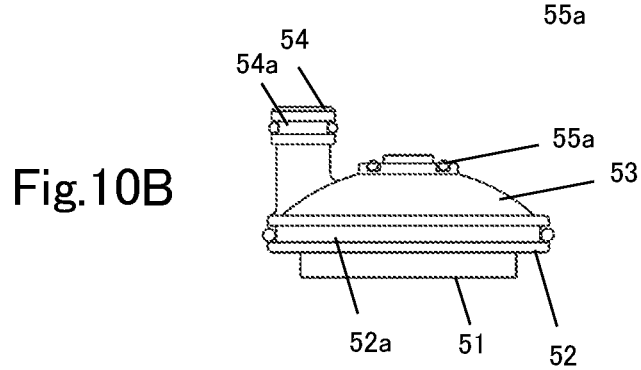
Figure 10C:
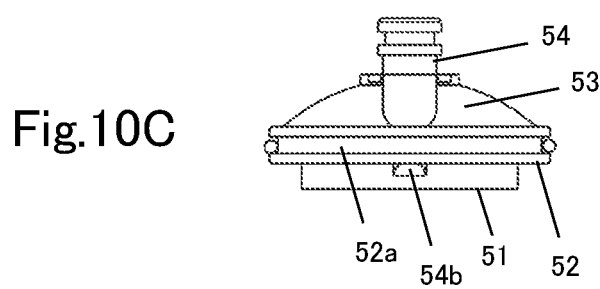
Figure 10D:
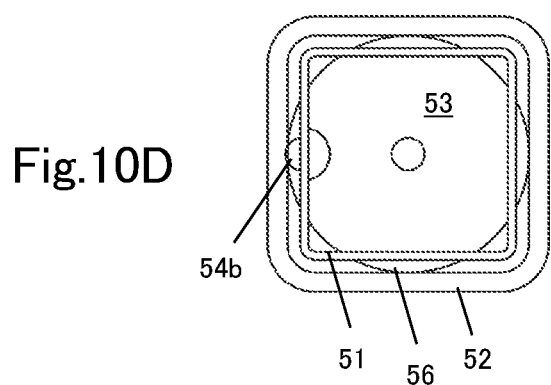

FIG. 9A and FIG. 9B illustrate the seal cover 90 that functions as a seal-pressing member. The seal cover 90 is an approximately square-shaped annular member having an opening 91 on its central portion. The inner periphery of the opening 91 is configured to come into contact with the outer periphery of the rubber seal 44. A plurality of cylindrical protrusions 92 are formed to extend upward from a portion adjacent to the center of the outer periphery on the top end face in the circumferential direction.

The upper lid body 50 is inserted from above the seal cover 90 to fit into the flange 43 through the opening end of the casing main body 40. If the upper lid body 50 is pressed downward, an inner lower edge 51 of the upper lid body 50 presses the rubber seal 44 from above, and an outer lower edge 52 of the upper lid body 50 is configured to press the cylindrical protrusions 92 from above.

As illustrated in FIG. 10A to FIG. 10D, the upper lid body 50 has an approximately square shape having an outer perimeter slightly smaller than the inner perimeter of the upper flange 43 of the casing main body 40 in a plan view, and includes a dome-shaped ceiling 53.

The central portion of the ceiling 53 has a fluid conducting opening 55 to which air or water for cleaning is supplied through the cleaning header pipe 24 (see FIG. 1). The filtrate-water discharging pipe 54 protruding upward that guides the filtrate water to the outside is formed adjacent to one side (the left side in FIG. 10A) of the approximately square-shaped outer periphery.

The peripheries of the outer lower edge 52, the filtrate-water discharging pipe 54, and the fluid conducting opening 55 respectively have recessed portions 52a, 54a, and 55a for housing O-rings, and are configured to be capable of being sealed so that a fluid passing through each of the above components will not leak.

Accordingly, the O-ring fitted to the recessed portion 52a formed in the outer peripheral edge surface enables the upper lid body 50 to be movable in the axial direction of the casing main body 40 while maintaining the attitude and while securing watertightness with the inner peripheral surface of the casing main body 40.

Figure 11A:
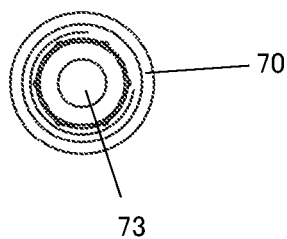
FIG. 11A, FIG. 11B, and FIG. 11C are respectively a plan view, a front view, and a bottom view of a maintaining unit of the membrane casing.
Figure 11B:
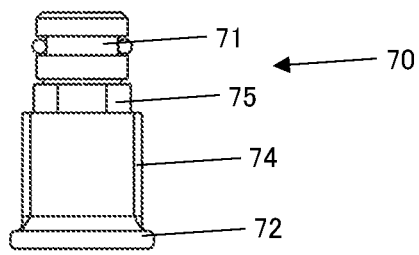
Figure 11C:
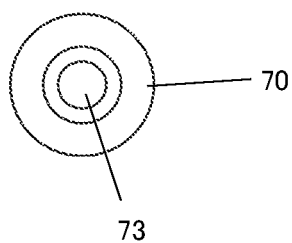
Figure 12A:
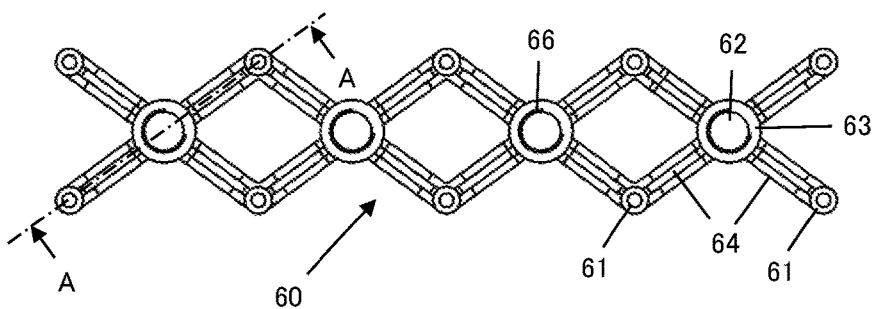
FIG. 12A, FIG. 12B, and FIG. 12C are respectively a plan view, a front view, and a side view of a supporting unit of the membrane casing.
Figure 12B:
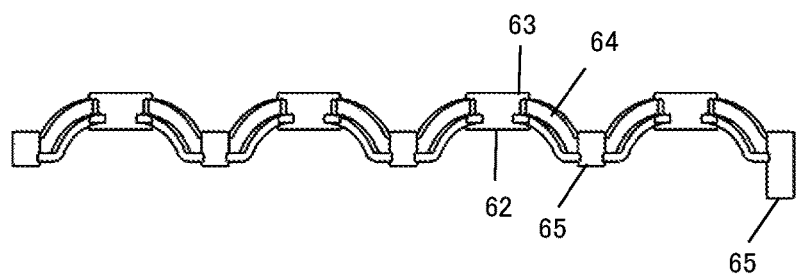
Figure 12C:
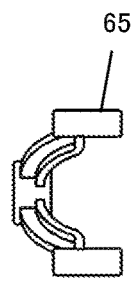
Figure 12D:
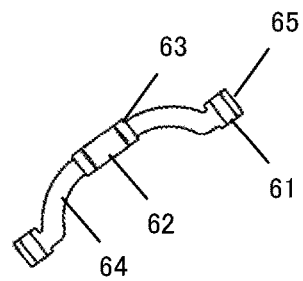
FIG. 12D is a cross-sectional view taken along the line A-A in FIG. 12A.

As illustrated in FIG. 11A, FIG. 11B, and FIG. 11C, the maintaining unit 70 is constituted of an approximately cylindrical tubular member including a fluid conducting pipe 73 for supplying air for cleaning or the like, and has a recessed portion 71 for housing an O-ring on the upper peripheral surface, as well as a flange 72 on the bottom end that comes into contact with pressure so as to maintain communication between the fluid conducting pipe 73 and the fluid conducting opening 55 (see FIG. 10A) of the upper lid body 50.

The outer periphery of the maintaining unit 70 includes an externally threaded portion 74 lying from the central portion toward the bottom in the up-down direction and includes a rotating operation unit 75 having a hexagonal cross-section above the externally threaded portion 74.

As illustrated in FIG. 12A to FIG. 12D, four supporting units 60 are disposed in a row corresponding to the four membrane components 20 constituting the membrane module 1. Each of the supporting units 60 includes an annular unit 63 on its central portion. Four beam units 64 extend from the annular unit 63 in a cross shape in a plan view. The beam units 64 are formed in arch shapes curving toward the outside along the top face of the dome-shaped ceiling 53. The inner wall of the annular unit 63 includes an internally threaded portion 66 that is screwed to the externally threaded portion 74 of the maintaining unit 70.

An end of each of the beam units 64 includes a tubular unit 65 that has a bolt insertion hole 61 for bolt-securing the supporting unit 60 to the bolt insertion hole 41 in the casing main body 40. Bolts are inserted into the bolt insertion holes 41 of the casing main body 40 and the bolt insertion holes 61 of the supporting unit 60 to secure the supporting unit 60 to the casing main body 40.

As illustrated in FIG. 5, the maintaining unit 70 including the fluid conducting pipe 73 is disposed above the fluid conducting opening 55 in the upper lid body 50 via an O-ring. The maintaining unit 70 is positioned and held on the central portion of the upper lid body 50 in a plan view by screwing the externally threaded portion 74 on the outer periphery of the maintaining unit 70 to the internally threaded portion 66 on the annular unit 63 of the supporting unit 60.

The degree of screwing of the externally threaded portion 74 and the internally threaded portion 66 is adjusted by rotationally operating the rotating operation unit 75 of the maintaining unit 70 by hand or with a tool. Accordingly, the degree of pressing on the upper lid body 50 by the maintaining unit 70 is adjusted on the basis of the supporting unit 60.

In other words, the supporting unit 60 and the maintaining unit 70 constitute a pressing mechanism for pressing the upper lid body 50 to keep the membrane element 2 housed in the casing main body 40 pressed and held. The maintaining unit 70 thus serves as a member that adjustably maintains the relative positions of the supporting unit 60 and the lid body 50 along the axial direction of the easing main body 40.

The inner lower edge 51 of the upper lid body 50 presses the rubber seal 44 from above, and the outer lower edge 52 of the upper lid body 50 presses the cylindrical protrusions 92 from above. The membrane element 2 is thus more firmly secured between the upper lid body 50 and the rubber seal 44 disposed in the recessed portion 36 of the base 30.

If raw water is supplied with pressure through the raw-water header pipe 22, the raw water flows into the fluid conducting holes 3 that are open on the bottom end face of the membrane element 2, travels upward, and filtered by the filtration membranes 4 formed on the inner faces of the fluid conducting holes 3. The filtrate water flows out of the peripheral faces 6c and 6d (see FIG. 4).

The filtrate water filtered by the membrane element 2 flows into the space between the peripheral faces of the membrane element 2 and the inner walls of the casing main body 40, passes through a space between the upper flange 43 of the casing main body 40 and the seal cover 90 pressing the rubber seal 44 and a space 56 (see FIG. 10D) between the inner lower edge 51 and the outer lower edge 52 of the upper lid body 50, and is guided to the filtrate-water discharging pipe 54 through a lower opening 54b of the filtrate-water discharging pipe 54 that communicate with the space 56. The fluid conducting hole 3 illustrated in FIG. 5 is the fluid conducting hole 3 at the center illustrated in FIG. 4.

The membrane element 2 obtained by sintering a ceramic molding has some variations in height. The variations in height are, however, configured to be accommodated because the upper lid body 50 is configured to be positionally adjustable in the up-down direction with respect to the flange 43 of the easing main body 40 by the pressing mechanism 60 and 70 to configure the filtrate-water discharging pipe 54 on the upper lid body 50 to be positionally adjustable in the up-down direction with respect to the filtrate-water header pipe 26. Needless to say, a watertight structure is maintained because each position adjusting unit is equipped with an O-ring.

In addition, if the upper lid body 50 and the rubber seal 44 are removed, the upper end of the membrane element 2 is in a protruded state in the upper flange 43, in other words, in an end edge having a diameter larger than the diameter of the central portion, of the casing main body 40. A gap exists between the upper flange 43 and the peripheral faces of the membrane element 2, which facilitates a removing or inserting operation of the membrane element 2 from or into the casing main body 40.

In other words, the raw-water supply pipe 38 and the filtrate-water discharging pipe 54 are disposed at the end of the casing in the longitudinal direction of the casing main body 40, preferably in an approximately parallel direction. The raw-water supply pipe 38 and the filtrate-water discharging pipe 54 thus do not protrude outward far from the peripheral faces of the casing, and the installation space can be small in a plan view.

Since the casing includes the tubular main body 40 and the lid body 50 on which the filtrate-water discharging pipe 54 is disposed, a space for disposing a filtrate-water discharging pipe on a peripheral face of the casing is not required, and the footprint becomes much smaller in a plan view than in an aspect in which an end of a filtrate-water discharging pipe is coupled to a peripheral face of the casing.

The inner lower edge 51, which functions as a partition wall, of the lid body 50 is configured to hold the membrane element 2 via the rubber seal 44 and the cylindrical protrusions 92. This configuration creates a watertight state between the space between the peripheral faces of the membrane element 2 and the inner faces of the main body 40, and an end of the filtrate-water discharging pipe 54. Mixing of the raw water with the filtrate water is thus prevented.

The following describes another embodiment of the pressing mechanism.

Figure 13:
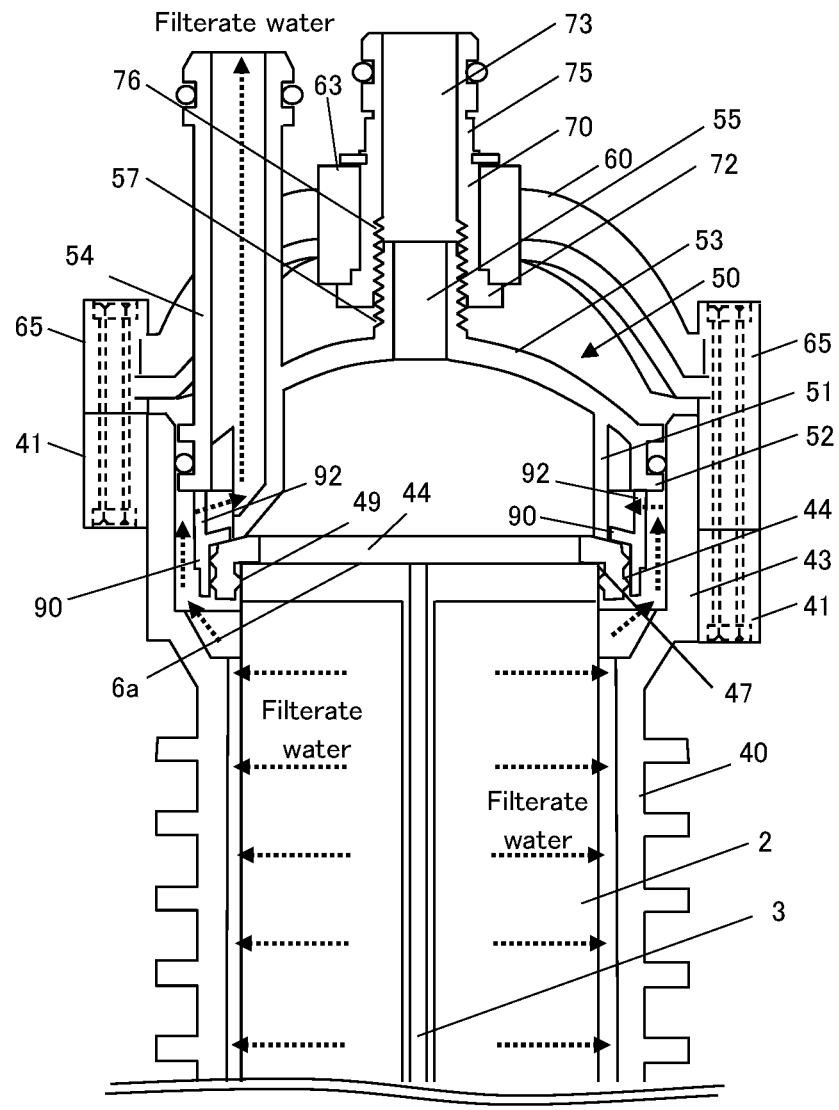
FIG. 13 is an illustrative diagram for a membrane casing constituting a membrane component according to another embodiment.

As illustrated in FIG. 13, the pressing mechanism may be configured such that the outer periphery of the maintaining unit 70 is formed into a smooth surface that can be fitted into the annular unit 63 of the supporting unit 60, the upper face of the flange 72 comes into contact with the lower face of the annular unit 63, an internally threaded portion 76 is formed on the inner periphery of the fluid conducting pipe 73, the fluid conducting opening 55 in the upper lid body 50 is configured to be a tube and to include an externally threaded portion 57 on its outer periphery, and the externally threaded portion 57 is screwed to the internally threaded portion 76. In this case, a C-ring may be fitted around the outer periphery of the fluid conducting pipe 73 above the annular unit 63 to prevent the fluid conducting pipe 73 from falling off the annular unit 63.

The maintaining unit 70 presses the upper lid body 50 downward with respect to the supporting unit 60 as a result of a rotational operation of the rotating operation unit 75 of the maintaining unit 70 while the maintaining unit 70 is positioned and held by the supporting unit 60. The degree of pressing can be adjusted by the degree of screwing, and the individual membrane element 2 is kept appropriately pressed and held. Although FIG. 13 does not illustrate a seal mechanism for the fluid conducting opening 55 and the fluid conducting pipe 73, watertightness may be secured by winding seal tape on the externally threaded portion 57, or the gap with the inner periphery of the fluid conducting pipe 73 may be sealed by forming a recessed portion for housing an O-ring on the distal end side above the externally threaded portion 57 on the outer periphery of the fluid conducting opening 55 as the embodiment described above.

Figure 14:
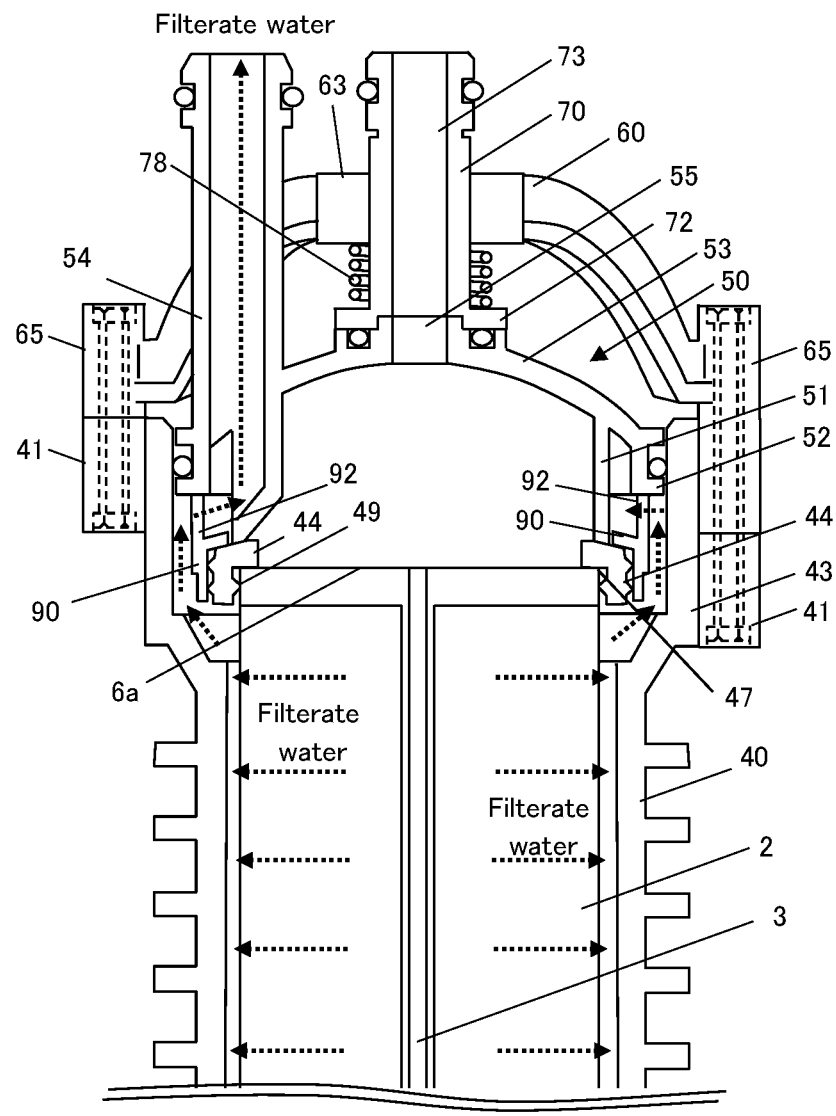
FIG. 14 is an illustrative diagram for a membrane casing constituting a membrane component according to still another embodiment.

Alternatively, as illustrated in FIG. 14, the pressing mechanism may be configured such that the outer periphery of the maintaining unit 70 is formed into a smooth surface that can be fitted into the annular unit 63 of the supporting unit 60, and a coil spring 78 is disposed between the flange 72 of the maintaining unit 70 and the annular unit 63. The upper lid body 50 in contact with the flange 72 is pressed downward with respect to the supporting unit 60 by an elastic restoring force of the coil spring 78.

In other words, the pressing mechanism that presses the lid body 50 and keeps the membrane element 2 housed in the casing main body 40 in a watertight state only has to include the supporting unit 60 supported by the casing main body and the maintaining unit 70 that adjustably maintains the relative positions of the supporting unit 60 and the lid body 50 along the axial direction of the casing main body 40. A specific mechanism for pressing may be configured to be a screw mechanism, a spring mechanism, or a combination of these mechanisms.

In this case, the maintaining unit 70 and the upper lid body 50 may be integrally formed instead of separately forming.

Figure 15:
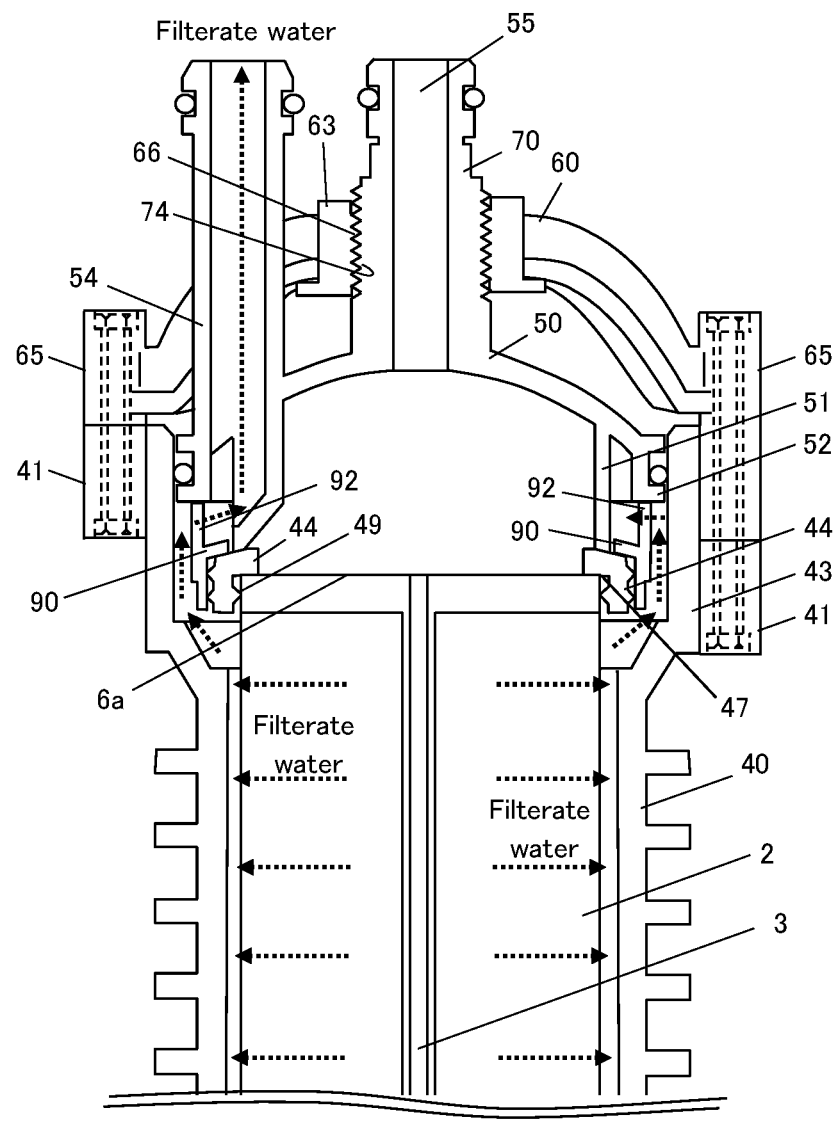
FIG. 15 is an illustrative diagram for a membrane casing constituting a membrane component according to still another embodiment.

As illustrated in FIG. 15, the pressing mechanism may be configured such that the upper lid body 50 and the maintaining unit 70 are integrally formed, the externally threaded portion 74 is formed on the outer periphery of the tubular fluid conducting opening 55, the annular unit 63 is configured to have the internally threaded portion 66 on its inner periphery and to be capable of inserted into or removed from the supporting unit 60, and the externally threaded portion 74 is screwed to the internally threaded portion 66. In this example, an upward movement of the annular unit 63 is configured to be limited by contact of the flange formed on the lower edge of the annular unit 63 with the supporting unit 60.

The embodiments described above disclose the configurations in each of which the upper lid body 50 equipped with an O-ring as a seal member in the recessed portion 52a on the outer peripheral edge face is fitted into the flange 43 from the opening end of the casing main body 40. However, the seal member may be disposed on the inner peripheral surface of the opening end of the casing main body 40, and/or the opening end of the casing main body 40 may be configured to be fitted into a tubular flange extending downward from the peripheral edge of the upper lid body 50 side. If the seal member is disposed on the opening end of the casing main body 40 side, a smooth surface is formed on the upper lid body 50 side in a moving range of the seal member.

In the embodiments described above, the supporting unit 60 is secured to the casing main body with bolts. However, a method for securing the supporting unit 60 to the casing main body is not limited to the above method and may be a securing method using clamps or pins or a joining method such as bonding and welding. If the casing main body or the membrane component is secured to a frame, the supporting unit 60 may be secured to the frame.

The basic configurations of the membrane casing and the membrane component according to the present invention have been described above with reference to the drawings. Needless to say, a specific configuration, size, shape, material, and the like of each component of the membrane casing and the membrane component are not limited to the aspects described in the embodiments above and can be selected and designed as appropriate, as long as the advantageous effects of the present invention can be obtained.

DESCRIPTION OF SYMBOLS

1: membrane module
2: membrane element
3: fluid conducting hole
20: membrane component
22: raw-water header pipe
24: cleaning header pipe
26: filtrate-water header pipe
30: casing (base that functions as a lid body)
38: raw-water supply pipe
40: casing (main body)
50: casing (upper lid body)
54: filtrate-water discharging pipe
60 supporting unit (pressing mechanism)
70: maintaining unit (pressing mechanism)

The invention claimed is:

1. A non-cylindrical membrane casing configured to watertightly house a non-cylindrical membrane element for filtering raw water, the membrane casing comprising:
   a non-cylindrical casing main body configured to detachably house the membrane element;
   a lid body configured to fit an opening end of the casing main body and configured to be movable in an axial direction of the casing main body while securing watertightness with the casing main body; and
   a pressing mechanism configured to press the lid body to press and hold the membrane element housed in the casing main body
   wherein the pressing mechanism comprises:
      a supporting unit configured to be supported by the casing main body; and
      a maintaining unit configured to adjustably maintain relative positions of the supporting unit and the lid body along the axial direction of the casing main body, and
   wherein the lid body is configured to be fitted to an opening end of the casing main body, a seal is disposed on an outer peripheral edge surface of the lid body to ensure watertightness with an inner peripheral face of the casing main body, and the inner peripheral face of the casing main body is smooth at least in a moving range of the seal.

2. The membrane casing according to claim 1,
   wherein the lid body has a fluid conducting opening through which a fluid inside the casing main body is capable of flowing, and
   wherein the maintaining unit comprises a fluid conducting pipe capable of being communicably coupled to the fluid conducting opening.

3. The membrane casing according to claim 2,
   wherein the maintaining unit comprises a tubular unit having an externally threaded portion on an outer periphery, and
   wherein the supporting unit comprises an annular unit having on an inner periphery an internally threaded portion configured to be screwed to the externally threaded portion of the maintaining unit.

4. The membrane casing according to claim 3,
   wherein the supporting unit comprises a plurality of arch-shaped beam units curving toward outside of the casing, and
   wherein the annular unit is coupled to the plurality of beam units.

5. The membrane casing according to claim 3,
   wherein the moving range of the seal is set to an end edge portion of the casing main body, and
   the end edge portion has a diameter larger than a diameter of a central portion of the casing main body.

6. A membrane component comprising:
   the membrane casing according to claim 1; and
   the membrane element housed in the membrane casing.

7. A membrane component comprising:
   the membrane casing according to claim 2; and
   the membrane element housed in the membrane casing.

8. A membrane component comprising:
   the membrane casing according to claim 3; and
   the membrane element housed in the membrane casing.

9. A membrane component comprising:
   the membrane casing according to claim 4; and
   the membrane element housed in the membrane casing.

10. The membrane casing according to claim 1,
wherein the maintaining unit comprises a tubular unit having an externally threaded portion on an outer periphery, and
wherein the supporting unit comprises an annular unit having on an inner periphery an internally threaded portion configured to be screwed to the externally threaded portion of the maintaining unit.

11. The membrane casing according to claim 10,
wherein the supporting unit comprises a plurality of arch-shaped beam units curving toward outside of the casing, and
wherein the annular unit is coupled to the plurality of beam units.

12. The membrane casing according to claim 10,
wherein the moving range of the seal is set to an end edge portion of the casing main body, and
the end edge portion has a diameter larger than a diameter of a central portion of the casing main body.

13. A membrane component comprising:
the membrane casing according to claim 10; and
the membrane element housed in the membrane casing.

14. A membrane component comprising:
the membrane casing according to claim 11; and
the membrane element housed in the membrane casing.

* * * * *